United States Patent
Clark et al.

[11] 4,040,289
[45] Aug. 9, 1977

[54] METHOD AND ARRANGEMENT FOR AIR TESTING OF SEWER LATERAL CONNECTIONS

[76] Inventors: Joseph H. Clark, 4015 Woodley Road, Ellicott City, Md. 21043; Leslie W. Grove, Jr., P.O. Box 609, Frederick, Md. 21701

[21] Appl. No.: 459,838

[22] Filed: Apr. 10, 1974

Related U.S. Application Data

[63] Continuation of Ser. No. 304,602, Nov. 8, 1972, abandoned.

[51] Int. Cl.² ............................................. G01M 3/28
[52] U.S. Cl. ........................................ 73/46; 138/90; 285/93
[58] Field of Search ............... 73/46, 49.8, 49.6, 49.5, 73/49.1, 40, 37; 138/89, 90; 285/93, 199, 198, 197

[56] References Cited

U.S. PATENT DOCUMENTS

| | | | |
|---|---|---|---|
| 963,498 | 7/1910 | Bard | 285/199 |
| 2,050,985 | 8/1936 | Trickey | 285/199 X |
| 2,100,884 | 11/1937 | Trickey | 285/199 |
| 2,462,575 | 2/1949 | Walker | 73/40 UX |
| 2,693,975 | 11/1954 | Smith | 285/199 X |
| 3,364,939 | 1/1968 | Valenziano | 285/199 X |
| 3,459,229 | 8/1969 | Croft | 138/90 |
| 3,558,162 | 1/1971 | Ferrai et al. | 285/93 |

*Primary Examiner*—Richard C. Queisser
*Assistant Examiner*—Joseph W. Roskos
*Attorney, Agent, or Firm*—Walter G. Finch

[57] ABSTRACT

An arrangement and method is provided for testing the seal of a sewer lateral saddle connector assembly used in connecting a lateral or branch sewer pipe line into a sewer main at a point where there is no "T" or "Y" connector available.

The sewer branch saddle connector assembly consists of a cast iron saddle which is arranged to fit over a hole to be tapped in the sewer main. A 360° circular rubber "O" ring sealing gasket is provided which is cemented in a retaining groove, on the underside of the sewer branch saddle connector assembly. A stainless steel strap, together with bronze "T" bolts and the attaching washers and nuts, secures the sewer branch saddle connector assembly to the sewer main, thus making a water-tight connection. The male connection end is shaped to accommodate all standard couplings and adaptors.

A sewer branch lateral tester is then positioned over the open end of the male connection and sealed thereto. Air pressure is then introduced into the sewer branch saddle connector assembly to ascertain if the rubber "O" ring sealing gasket has a leakage. If no pressure change is noticed after a predetermined period of time, then it is assumed the seal of the sewer branch saddle connector assembly to the sewer main is leakage proof and the entrance or opening for the sewer branch saddle connector assembly into the sewer main is then tapped.

1 Claim, 3 Drawing Figures

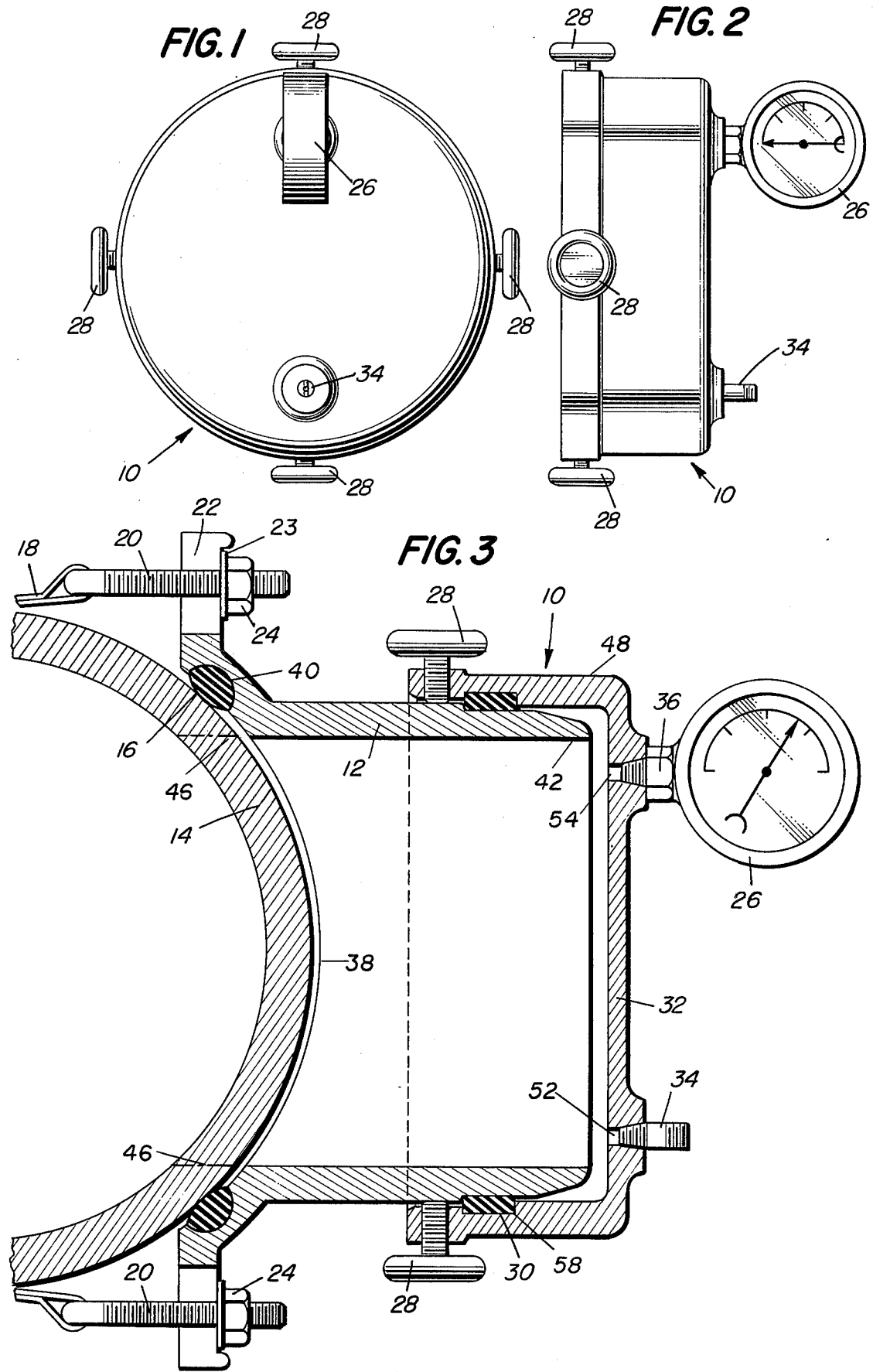

METHOD AND ARRANGEMENT FOR AIR TESTING OF SEWER LATERAL CONNECTIONS

This is a continuation of application Ser. No. 304,602, filed Nov. 8, 1972, now abaondoned.

This invention relates generally to sewer mains, and more particularly to a lateral tester for testing a sewer branch saddle connector assembly to ascertain if it is properly sealed to a sewer main.

Existing sanitary sewerage systems are often grossly overloaded because of the infiltration of subsurface water. When this infiltration occurs, the water must be treated along with the raw sewerage so that treatment plants become overloaded. This results in the discharge of effluents that pollute streams, lakes, rivers, bays, oceans, and the like.

Many sewerage mains are installed through areas zoned for future development and sized to admit and convey the sewerage from branch laterals to be connected as needed. Often these sewer mains are provided with tees and wyes to which future branch laterals can be efficiently attached.

However, these fittings are often omitted due to economics because they are costly and may remain unused for many years. When this condition exists and the need for lateral connections arises, it is then necessary to tap the sewer main and install a fitting that accepts the lateral. This is usually accomplished by using a saddle that is attached to the main by various methods.

Many of these connections are leak free but improper installations account for most of the infiltration problems. Thus, there is a need for a rapid, inexpensive method and arrangement for testing these fitting connections that would assure the absence of infiltration.

To solve the problem, the fitting should be installed prior to tapping the main. Then a cap which would surround, enter into or fit against the fitting would be clamped in place. A suitable resilient gasket would be provided at the contact point between fitting and cap. This would provide a void into which a gas or liquid could be admitted under pressure and a leak, if any, could then be readily noted.

Therefore, it is a principal object of this invention to provide a method and arrangement for testing a sewer branch saddle connector assembly to ascertain if it is properly sealed to a sewer main.

Another object of this invention is to provide a a rapid and inexpensive method and arrangement for testing sewer branch saddle connector assembly which will assure the absence of infiltration of water into a sewer main.

And another object of this invention is to provide a sewer branch lateral tester which is of lightweight and easy to transport and operate by a single operator.

To provide a sewer branch lateral tester which is economical to manufacture, efficient and reliable in operational use, and easy to maintain, is another object of this invention.

Other objects and attendant advantages of this invention will become more readily apparent and understood from the following detailed specification and accompanying drawings in which:

FIG. 1 is an end view of a lateral tester incorporating features of this invention;

FIG. 2 is a side view of the lateral tester of FIG. 1; and

FIG. 3 is a cross-sectional view through a sewer pipe, a lateral sewer pipe, and the lateral tester of FIGS. 1 and 2 mounted to the lateral sewer.

Referring now to the drawings, there is shown in FIGS. 1 and 2 a lateral tester 10 for use in testing a sewer branch saddle connector assembly 12 shown in FIG. 3 being readily placed onto a main sewer pipeline 14, or sewer main. This sewer branch saddle connector assembly 12 is centered over a hole to be tapped in the sewer main 14 and indicated by the dash lines 46 in the sewer main 14. The sewer saddle branch connector assembly 12 is manufactured in all of the standard sizes, made of cast iron, and covered with a heavy dip of black asphaltum type paint. This sewer branch saddle connector assembly 12 is further described in detail in a co-pending U.S. patent application Ser. No. 220,744, filed by Joseph H. Clark et al for "Sewer Branch Saddle Connector" on Jan. 26, 1972.

Its underside 38 is curved to fit the sewer main 14. A recessed 360° circular retaining groove 40, shown best in FIG. 3, is provided at the base of the sewer branch saddle connector assembly 12 into which a circular rubber "O" ring sealing gasket 16 is cemented.

The male connection end 42 of the sewer branch saddle connector assembly 12 is shaped to accommodate all asbestos-cement coupling and adapters so they are readily adaptable to branch lines of either A-C pipe, iron or clay pipes. Thus, when adapting to iron or clay pipes, the "M" ring and 6 inch nipple are eliminated.

On each side of the sewer branch saddle connector assembly 12 there are provided slotted members 22 which are used for attaching a flat metal strap 18. The strap 18 is made of stainless steel and it is secured to the sewer branch saddle connector assembly 12 by use of the slotted members 22 and bronze "T" bolts 20, washers 23 and hex nuts 24. By using a combination of cast iron, stainless steel and bronze materials, all corrosion problems are eliminated and a trouble free connection is assured.

The tapped hole 46 is not cut into the sewer main 14 until the sealed connection between the sewer branch saddle connector assembly 12 and the sewer pipe is tested for air leakage by the lateral connection tester 10 of this invention. As shown in FIGS. 1 and 2, the lateral connection tester 10 consists of a cylindrical housing 48 closed at one end 32 and opened at the opposite end 50.

Threaded inlet and outlet ports 52 and 54, respectively, are provided in the end 32 of the housing 48 for a valve fitting 34 for a tire pump (not shown) or other source of air pressure and a pressure gauge 26. The pressure gauge 26 is coupled to the outlet port 54 by a fitting 36.

A plurality of spaced thumb screws 28 are provided to secure the housing 48 to the end 42 of the sewer branch saddle connector assembly 12. An annular gasket 30 is provided in a slot 58 of the inner surface of the cylindrical housing 48 to seal the housing 48 to the sewer branch saddle connector assembly 12 as shown best in FIG. 3.

The pneumatic pressure test is used because the air pressure generated with a hand pump would be most practical under the adverse conditions encountered during remote installations of sewer branch saddle connector assemblies 12. It is to be noted that a bicycle tire pump would easily generate sufficient pressure for the test of the seal 16 of the sewer branch saddle connector assembly 12.

In actual operation, the sewer branch saddle connector assembly 12 is first installed on the sewer main or pipe 14 as shown in FIG. 3. The lateral tester 10 is then installed, and air pressure is applied within the sewer branch saddle connector assembly 12 to the required pressure in pounds per square inch. The internal pressure in the sewer branch saddle connector assembly 12 will be indicated by the pressure gauge 26.

The air pressure is allowed to remain for a short period and if there is no pressure loss in the sewer branch saddle connector assembly 12, it is certain that there is a leak-proof connection between the sewer branch saddle connector assembly 12 and the sewer main 14.

Next, the internal pressure in the sewer branch saddle connector assembly 12 is released by depressing the air valve 34 or through a quick release valve that may be a part of the lateral tester 10. The lateral tester 10 is then removed from sewer branch saddle connector assembly 12.

Finally, the inlet opening or tap 46 is then tapped into the sewer main 14 through the interior of the sewer branch saddle connector assembly 10 by means of a conventional tool. The method and procedure outlined assures a perfect alignment of the inlet opening or tap 46 with the sewer branch saddle connector assembly 12 as well as a leak-proof connection.

Obviously many modifications and variations of the present invention are possible in light of the above teachings. It is, therefore, to be understood that within the scope of the appended claims the invention may be practiced otherwise than as specifically described.

What is claimed is:

1. Apparatus for testing the seal formed between a primary sewer main and a secondary sewer connector upon assembly of said secondary sewer connector to said primary sewer main prior to tapping into said primary sewer main, said secondary sewer connector consisting of a substantially cylindrical housing mating at one end with the outer surface of said primary sewer main and being sealed thereto, said secondary sewer connector having a peripheral groove adjacent to, but spaced apart from the inside edge of the wall of said substantially cylindrical housing, said seal consisting of a flexible rubber ring set in said groove in said wall of said substantially cylindrical housing, said flexible rubber ring interfacing with said outer surface of said primary sewer main and securely sealed to said outer surface by at least one removably attached clamping strap with toggle connectors at each end, said clamping strap encompassing said primary sewer main opposite said secondary sewer connector, each end of said clamping strap terminating in a welded loop into each of which is fitted the eye of said toggle connector, each said toggle connector being removably engaged and connected at the upper end of said toggle connector into open end of horizontal lug yokes attached to two sides of said secondary sewer connector, with a nut on each said toggle connector in order to tighten said clamping strap around said primary sewer main and thereby compress said flexible rubber ring to establish said seal, said substantially cylindrical housing being open at the end opposite of said seal with the primary sewer main to receive said apparatus for testing said seal, said apparatus for testing said seal formed between said primary sewer main and said secondary sewer connector comprising:

a cylindrical housing cap, said cap being open at one end to receive said open end of said secondary sewer connector, and closed at its opposite end, said closed end having spaced inlet and outlet ports disposed therein;

a plurality of screw knobs oppositely mounted on said cylindrical housing cap and engageable with said secondary sewer connector for fixedly securing said cylindrical housing cap to said secondary sewer connector to form an enclosed chamber defined by said cylindrical housing cap, said secondary sewer connector, and that portion of said primary sewer main connected to said secondary sewer connector, said cylindrical housing cap having an annular slot in the inner wall thereof;

a flexible rubber sealing annular gasket disposed between said cylindrical housing cap and said secondary sewer connector, and fixedly held within said annular slot disposed in said inner wall of said cylindrical housing cap, said annular gasket being held in said annular slot for contact against an outer wall of said secondary sewer connector;

means for introducing a gas under pressure into said enclosed chamber through said inlet port;

a pressure gauge for measuring the pressure in said enclosed chamber; and a valve for removing said pressure in the enclosed chamber through said outlet port.

* * * * *